United States Patent [19]

Starodubov

[11] Patent Number: 5,881,188
[45] Date of Patent: Mar. 9, 1999

[54] OPTICAL FIBER HAVING CORE SEGMENT WITH REFRACTIVE-INDEX GRATING

[75] Inventor: Dmitry S. Starodubov, Los Angeles, Calif.

[73] Assignee: D-Star Technologies, Inc., Manhattan Beach, Calif.

[21] Appl. No.: 63,240

[22] Filed: Apr. 20, 1998

Related U.S. Application Data

[62] Division of Ser. No. 898,456, Jul. 24, 1997, which is a division of Ser. No. 775,461, Dec. 30, 1996, Pat. No. 5,745,617.

[51] Int. Cl.[6] .................................................. G02B 6/34
[52] U.S. Cl. .......................... 385/37; 359/566; 385/123
[58] Field of Search .............................. 385/10, 15, 27, 385/31, 37, 39, 123; 359/566–576

[56] References Cited

U.S. PATENT DOCUMENTS

| | | | |
|---|---|---|---|
| 4,329,385 | 5/1982 | Banks et al. | 428/141 |
| 4,362,943 | 12/1982 | Presby | 250/459.1 |
| 4,474,427 | 10/1984 | Hill et al. | 385/123 |
| 5,066,133 | 11/1991 | Brienza | 359/570 |
| 5,104,209 | 4/1992 | Hill et al. | 385/27 |
| 5,157,747 | 10/1992 | Atkins et al. | 385/37 |
| 5,287,427 | 2/1994 | Atkins et al. | 385/124 |
| 5,327,515 | 7/1994 | Anderson et al. | 385/123 |
| 5,351,321 | 9/1994 | Snitzer et al. | 385/10 |
| 5,367,588 | 11/1994 | Hill et al. | 385/37 |
| 5,574,810 | 11/1996 | Byron et al. | 385/37 |
| 5,604,829 | 2/1997 | Bruesselbach | 385/37 |
| 5,620,495 | 4/1997 | Aspell et al. | 65/392 |
| 5,652,818 | 7/1997 | Byron | 385/37 |
| 5,745,617 | 4/1998 | Starodubov et al. | 385/37 |

OTHER PUBLICATIONS

Dianov and Starodubov, "Microscopic Mechanisms Of Photosensitivity In Germanium–Doped Silica Glass", SPIE Proc. 2777, pp. 60–70 (1995) (Sep.).

Meltz, Morey and Glenn, "Formation Of Bragg Gratings In Optical Fibers By A Transverse Holographic Method", Optics Letters, vol. 14, No. 15, pp. 823–825 (Aug. 1, 1989).

Atkins and Espindola, "Photosensitivity And Grating Writing In Hydrogen Loaded Germanosilicate Core Optical Fibers at 325 and 351 nm", Appl/Phys. Lett. 70 (9), pp. 1068–1069 (Mar. 3, 1997).

Kashyap, "Photosensitive Optical Fibers: Devices and Applications", Optical Fiber Technology 1, pp. 17–34 (1994) [No Month].

Dianov, Starodubov, Vasiliev, Frolov and Medvedkov, "Near–UV Photosensitivity Of Germanosilicate Glass: Application For Fiber Grating Fabrication," 9th Annual Meeting of IEEE Lasers and Electro–Optics Society, 1996 Annual Meeting (Nov. 1996), paper TuCC2, 2 pp.

Dianov, Kurkov, Medvedkov and Vasil'ev, "A New Sensitive Method For Measuring Induced Refractive Index Change In Optical Fiber Core", Photosensitivity and Quadratic Nonlinearity in Glass Waveguides (Fundamentals and Applications), Optical Society of America, 1995 Technical Digest Series, vol. 22 (Sep. 1995), 4 pp.

*Primary Examiner*—John D. Lee
*Attorney, Agent, or Firm*—Bryan Cave LLP

[57] ABSTRACT

A grating is induced in the core of a hydrogen-loaded high-germanium-content optical fiber using near-UV (275 nm–390 nm) laser light. An interference pattern is generated at the core using a molded polymer phase mask with a square wave surface relief pattern. The light is directed through the phase mask, through a protective fiber coating, through the cladding, and into the core. The phase mask generates an interference pattern with a period half that of the surface relief pattern. Index of refraction changes occur at the bright fringes of the interference pattern—thus creating the grating. Advantages over existing mid-UV technology include lower fabrication costs for phase masks, simplified grating induction since fiber coatings do not need to be removed, and reduced infrared absorption caused by grating formation in the fiber.

3 Claims, 7 Drawing Sheets

OPTICAL FIBER HAVING CORE SEGMENT WITH REFRACTIVE-INDEX GRATING

This application is a divisional of U.S. patent application Ser. No. 08/898,456 filed Jul. 24, 1997, entitled NEAR-ULTRA-VIOLET FORMATION OF REFRACTIVE-INDEX GRATING USING PHASE MASK, naming Dmitry S. Starodubov as sole inventor, which is a divisional of U.S. patent application Ser. No. 08/775,461, filed Dec. 30, 1996, entitled NEAR-ULTRA-VIOLET FORMATION OF REFRACTIVE-INDEX GRATING USING PHASE MASK, naming Dmitry S. Starodubov and Jack L. Feinberg as joint inventors, now U.S. Pat. No. 5,745,617, issued Apr. 28, 1998.

BACKGROUND OF THE INVENTION

The present invention relates to optical media and, more particularly, to the fabrication of gratings within optical media. A major objective of the invention is to provide for less absorptive refractive-index gratings in optical fibers and to make such gratings easier and more economical to fabricate.

Along with the increasing prominence of the Internet has come wideranging demand for increased communications capabilities, including more channels and greater bandwidth per channel. Optical media, such as optical fibers, promise an economical alternative to electrical conductors for high-bandwidth long-distance communications. A typical optical fiber includes a silica core, a silica cladding, and a protective coating. The index of refraction of the core is higher than the index of refraction of the cladding to promote internal reflection of light propagating down the core.

Optical fibers can carry information encoded as optical pulses over long distances. The advantages of optical media include vastly increased data rates, lower transmission losses, lower basic cost of materials, smaller cable sizes, and almost complete immunity from stray electrical fields. Other applications for optical fibers include guiding light to awkward places (as in surgery), image guiding for remote viewing, and sensing.

The signal carrying ability of optical fibers is due in part to the capability of producing long longitudinally-uniform optical fibers. However, longitudinal variations in index of refraction, e.g., those associated with refractive-index gratings, can be included in the optical fibers to affect throughgoing pulses in useful ways. Gratings can be grouped into short-period, e.g., about 0.5 micron ($\mu$m), or long-period, e.g., about 200 $\mu$m, gratings. Short-period gratings can reflect incident light of a particular wavelength back on itself in the fiber. (Short-period gratings are also called Bragg gratings or Hill gratings.) Long-period gratings can couple incident light of a particular wavelength into other co-propagating modes on the fiber. Some of these other co-propagating modes may be lossy, so the overall effect of the long-period grating can be to selectively block certain wavelengths from propagating efficiently through the fiber.

While there are many methods for establishing a refractive-index grating within a fiber, the most practical methods involve exposing photosensitive fibers to patterned light. The index of refraction of certain fiber-optic materials, such as germanium-doped silica, is changed upon exposure to mid-ultra-violet (mid-UV) light, e.g., wavelengths between 190 nanometers (nm) and 270 nm; the photosensitivity of such a fiber can be enhanced by hydrogen loading. Lasers for altering the refractive index of fibers that span the above mid-UV wavelength range include ArF excimer lasers with a laser output at 193 nm and the fourth harmonic of a 1064 nm Nd:YAG laser at 266 nm.

It has been believed that the mid-UV light dislodges electrons at germanium oxygen deficient centers (GODC) to cause the change in the index of refraction. Exposing a germanium-doped fiber to mid-UV light that varies in intensity periodically in space creates a corresponding spatially varying pattern of refractive index in the fiber. Such a spatially varying index of refraction is referred to as a refractive-index grating.

Methods of generating the desired light pattern can be distinguished according to whether or not they rely on interference. Methods not employing interference rely on amplitude masks. For example, a photoresist or metal amplitude mask can be photolithographically defined on the cladding of a waveguide or a fiber, the coating of which has been removed over the region where a grating is to be formed. However, diffraction effects limit the effectiveness of the amplitude mask, especially when applied to short-period gratings. In addition, the fine structure of the amplitude mask defining the dark regions can be burned off by absorbed laser energy.

Alternatively, a single slit can be stepped across the length of fiber in which the Bragg filter is to be defined. Such a method is disclosed in U.S. Pat. No. 5,105,209. The method has been extended recently to writing long period gratings using near-UV wavelengths using argon lasers with high-coherence. (E. M. Dianov, D. S. Starodubov, S. A. Vasiliev, A. A. Frolov, O. I. Medvedkov, Paper TuCC2, Vol. 1 of LEOS'96 Annual Meeting Proceedings, pp. 374–375, 1996). Generally, the time required for the step-by-step writing is lengthy and the mechanical precision required for the stepping can be prohibitive.

More practical methods of inducing a Bragg grating take advantage of interference. A coherent laser beam can be split and the resulting beam components can be made to intersect. Due to the wave nature of light, the intersecting components will add at some locations and cancel at other locations, creating a spatially alternating pattern of light and dark.

For example, U.S. Pat. No. 4,474,427 to Hill discloses a method in which visible light is launched into the core of a fiber and reflected at an opposite end of the core. The result is a standing wave with a period corresponding to half the wavelength of the light. Through a photosensitive effect in the fiber, a refractive-index grating with this period is written into the core of the fiber. In this case, the light used was blue-green at around 480 nm. In this case, the gratings are created by two-photon absorption, corresponding to the energy associated with 240 nm light.

An important advantage of this core-launch approach is that neither the cladding nor the protective polymer coating needs to be removed for the grating to be induced. However, this method is limited to producing gratings for reflecting wavelengths close to that of the writing light. Furthermore, the core-launch approach does not provide for gratings with an arbitrary spatial variation of index amplitude and period imposed over the length of the grating itself; these include chirped and apodized gratings.

More flexibility in defining gratings can be achieved by directing interfering beams transversely. As disclosed in U.S. Pat. No. 4,807,950 to Glenn et al., two beams directed transversely into a fiber can be made to interfere. The spatially varying interference pattern creates a spatially varying refractive-index pattern. By changing the angle of the two incident light beams it is possible to vary the spatial period of the intensity pattern, which alters the reflecting wavelength of the resulting grating. The interference pattern of two light beams can be created by the use of beamsplitters and mirrors, or with a prism by the technique of Lloyd's interferometer (U.S. Pat. No. 5,377,288).

To produce an interference pattern, a laser beam must be split and then recombined. Mirror vibrations and limits on coherence length can limit the visibility of the interference pattern formed when the beams recombine. Addressing this problem, U.S. Pat. No. 5,367,588 to Hill et al. uses a phase mask in close proximity to a fiber to split the beam and direct its components so that they interfere at the fiber core. The phase mask can be a block of material with a surface relief pattern that acts as a series of beam splitters. Even low-coherence lasers, such as excimer lasers, can be used with such a phase mask. So that it transmits 245 nm light, the phase mask is formed of fused silica.

The fused silica is etched with an appropriate square-wave surface relief pattern using electron-beam lithography. When a phase mask is used, the period of the induced grating is one-half that of the surface relief pattern when the mask and core are parallel. The grating period can be increased slightly by tilting the mask slightly relative to the core. (Larger tilts result in gratings that no longer reflect light into the fiber.) Disadvantages of this phase-mask method include the cost of the phase mask: the main expense being the cutting of the pattern using electron-beam lithography. The cost scales with the length of the phase mask; long gratings are very expensive. It is not practical to fabricate long gratings in this manner. Another expense is the fused silica which must be very pure to transmit mid-UV light.

There are also problems with obtaining an appropriate light. An excimer laser can provide the mid-UV light, but has a short coherence length. It also provides a pulsed rather than a preferred continuous output. A frequency-doubled argon laser can be used for a continuous output, but frequency doubling poses its own complications. Advances in semiconductor lasers promise better lasers in the desired frequency range, but these are not currently available. Thus, there remains room for more convenient and cost effective means for inducing gratings in an optical fiber.

SUMMARY OF THE INVENTION

The present invention is directed to a method of making a phase mask using radiation imagery and such a mask capable of being made by this method. The present invention enables inducing of gratings using interference of light having near-UV wavelengths in the range 275–390 nm. This relaxes the constraint on the phase mask material; very pure fused silica is not required. Lower purity fused silica, alternative glasses, various polymers, and plastics can be used.

A refractive-index grating is to be formed in an optical waveguide such as an optical fiber or a planar waveguide. At least at the time the grating is to be formed, the waveguide must include material in which changes of refractive index can be photo-induced using near-UV light. The photo-sensitivity may or may not remain after the grating is formed.

The phase mask defines a spatially varying optical path length therethrough. The spatially varying optical path length varies either by varying the physical path length or by varying the index of refraction of the phase mask or both. In either case, the spatial variation is along the cross-section of a beam transmitted through said mask. As the phrase "through the mask" is used herein, it encompasses both the case where light enters a back face and exits a front face, and the case where the light enters the front face, is reflected off the back face, and exits the front face. In either case, the front face is taken to be the face of the phase mask facing the fiber in which the grating is to be induced.

Alternately, the front face of the phase mask can contain a surface relief pattern that is coated with a metal such as aluminum or a dielectric layer to make it highly reflective. In this case light is reflected off of the front face of the mask to make an interference pattern in the fiber core.

For example, U.S. Pat. No. 5,351,321 to Snitzer et al. uses a solid block of material with a periodically varying index of refraction to generate a grating; in this case, the plane is through the block of solid material. U.S. Pat. No. 5,367,588 to Hill et aL discloses a phase mask having a surface-relief pattern that creates a spatially varying physical path length. Note that the surface relief pattern defines a spatially varying refractive index over a plane through the surface relief pattern: the refractive index varies according to whether the plane intersects the protruding areas of mask material or the air or other material in the interstices. A third possibility is a phase mask with a shield over a surface relief pattern. A fourth possibility is a phase mask with a reflective surface relief pattern. If the reflective surface relief pattern is arranged on its back face, a spatially varying optical path length is presented to light entering and exiting the front face of the phase mask.

The present invention provides for molding a phase mask so that it has a surface-relief pattern suitable for generating a grating. A mold for the phase mask can include a substrate with an appropriate surface relief pattern. The substrate surface relief pattern is technically complementary to the surface relief pattern for the phase mask. However, where the surface relief pattern includes square or sine wave patterns, the surface relief patterns of the substrate and phase mask are essentially identical. In this case, the mold substrate can itself be a phase mask. Thus, existing phase masks for mid-UV light can be used to produce phase masks for the near-UV light employed by the present invention.

The mold material begins as a liquid or plastic and ends as a solid structure that is at least half as transmissive as it is absorptive of light of the writing wavelength. The transmissivity of the structure is a function both of its material and the length of the light path through the material. Preferably, the transmissivity is much greater than the absorption. The liquid can be a polymerizable liquid that solidifies upon polymerization. Alternatively, the liquid can be an elevated-temperature melt, e.g., of plastic, that solidifies upon cooling. Also, the liquid can be a silica sol in a sol-gel process; it forms a gel that is dried and heated to form a solid glass. After solidification, the resulting structure is removed from the substrate, yielding the desired phase mask. Optionally, the surface relief pattern can be coated with a reflective layer or layers to define a reflective phase mask.

A method of the invention involves a submethod of fabricating a phase mask, as described above, and a submethod of using the phase mask to generate a grating. The latter submethod involves disposing the phase mask in a suitable position near the optical fiber. Near-UV light is transmitted through or reflected from the phase mask to produce the desired interference pattern through the fiber core.

The resulting fiber grating written with near-UV light, e.g., 334 nm produced by an argon laser, can be differentiated from a fiber grating written with mid-UV light, e.g., 245 nm. In the former case, the absorption of light at 290 nm is at least ten times less than its absorption of light at 240 nm; in the latter case, the absorptions are within a factor of four of each other. In the former case, the fiber grating has a paramagnetic resonance spectrum in which the strength of the Ge(1) center is at least an order of magnitude less than the strength of the GeE' center; in the latter case, the respective strengths are within a factor of three of each other.

What is surprising is that the grating-induction effectiveness of the near UV light relative to the effectiveness of the shorter wavelength light is greater than would be expected by comparing the absorption of an optical fiber at these wavelengths. A typical optical fiber is about 1000 times more absorptive at 245 nm (mid-UV) than at 334 nm (near-UV). Yet the effectiveness of the grating induction at 245 nm is only 10 times more than the effectiveness at 334 nm. The reason for this surprising result is not completely understood.

By way of proposed explanation, and not of limitation, it is believed that the electron loss previously assumed to contribute to the change of refractive index actually contributes more to an increase in absorption. A second mechanism, that of bond restructuring is more closely related to the change in refractive index. This bond restructuring is achieved more directly using near-UV light than it is using mid-UV light.

On the other hand, near-UV light is less likely to cause electron losses. Accordingly, the invention yields gratings that are less absorptive of throughgoing light than are fibers with gratings induced by mid-UV light. When mid-UV light is used to induce gratings, the absorption of the core region in which the grating is induced is increased. This is especially true for fibers "loaded" with hydrogen to increase their photosensitivity. When near-UV light is used, the increase in absorption is much less, especially in the case of hydrogen loaded fibers.

Another major advantage of the invention is that the protective coating of an optical fiber need not be removed for a grating to be induced. The typical silicone coatings are far more transmissive of at least some near-UV wavelengths than of mid UV wavelengths. Therefore, the grating-inducing laser light can be directed through the coating. This avoids the requirement of most grating induction methods, including other transverse interference methods, of removing the coating to induce the grating. Thus, the tedious steps of coating removal and replacement are avoided. This results in a considerable saving in manufacturing time and cost.

Furthermore, a near-UV transparent fiber coating can serve as a phase mask by imposing on it a spatially varying refractive index. This can be accomplished by heating a portion of the coating until it achieves plasticity. Then a surface-relief pattern mold can be pressed into the softened coating. The coating is cooled so that its surface assumes the surface-relief pattern. The refractive-index varies in a plane through the surface-relief pattern between the refractive index of silicone and the refractive index of air.

Since it has higher energy photons and is absorbed more completely, mid-UV light heats a fiber during writing more than does near-UV light. The heat so generated can be sufficient to erase the grating as it is being written. This problem is avoided at near-UV wavelengths which have less energy per photon and are absorbed more weakly.

Another advantage of the present invention is that phase masks can be much more economical: molding can be much less expensive than etching with an electron stepper. In particular, long gratings can be much less expensive. Also, phase masks can be mass produced and standardized since they come from the same mold. In addition, less expensive materials can be used for the phase mask. Moreover, it is easier to obtain lasers with the desired characteristics at the longer laser wavelengths. These and other features and advantages of the invention are apparent from the description below with reference to the following drawings.

DETAILED DESCRIPTION OF THE PREFERRED EMBODIMENTS

Figure 1:
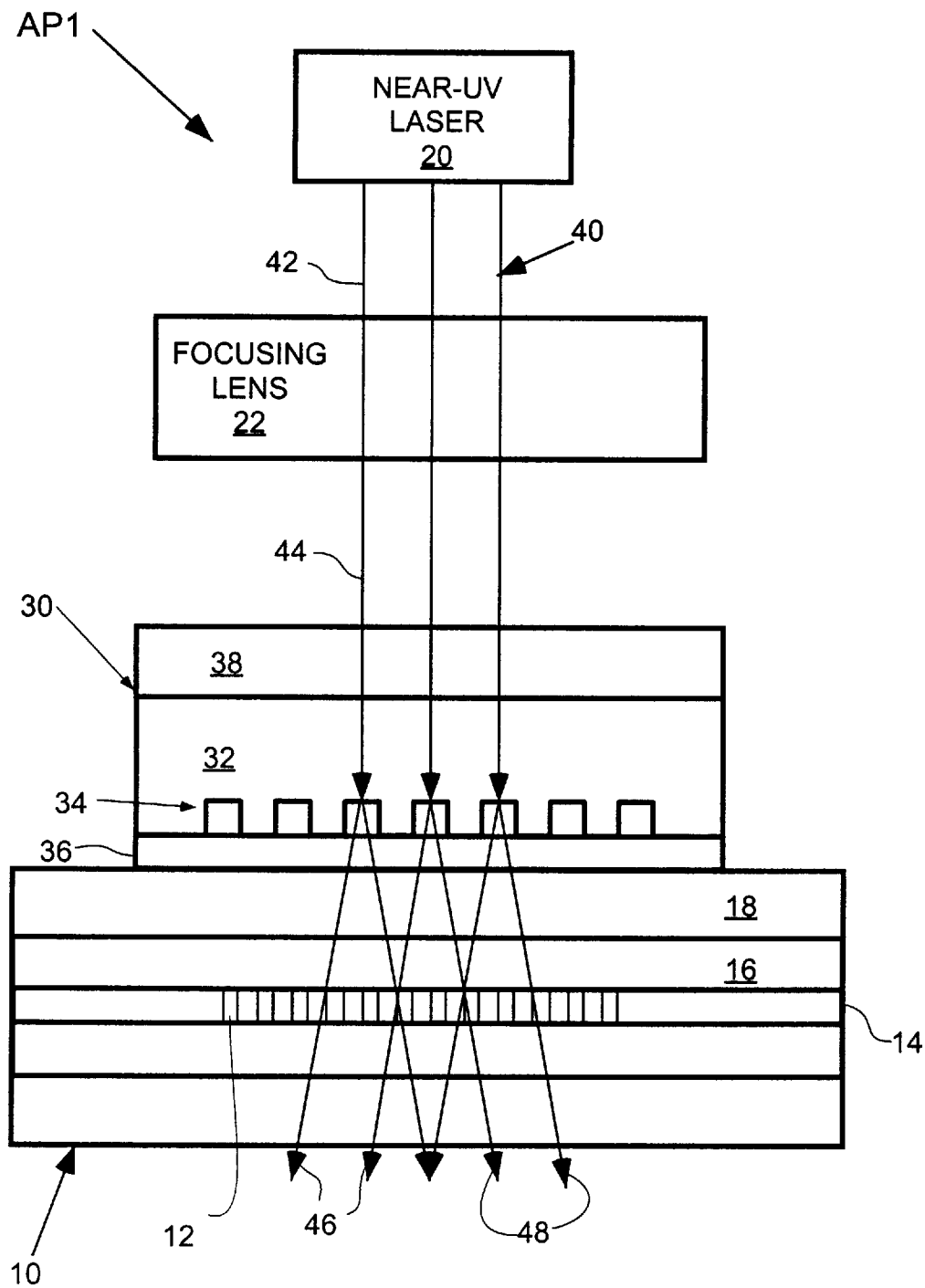
FIG. 1 is a schematic side view of a system for inducing a grating in an optical fiber in a system employing a phase mask made in accordance with the method of the present invention.
Figure 2:
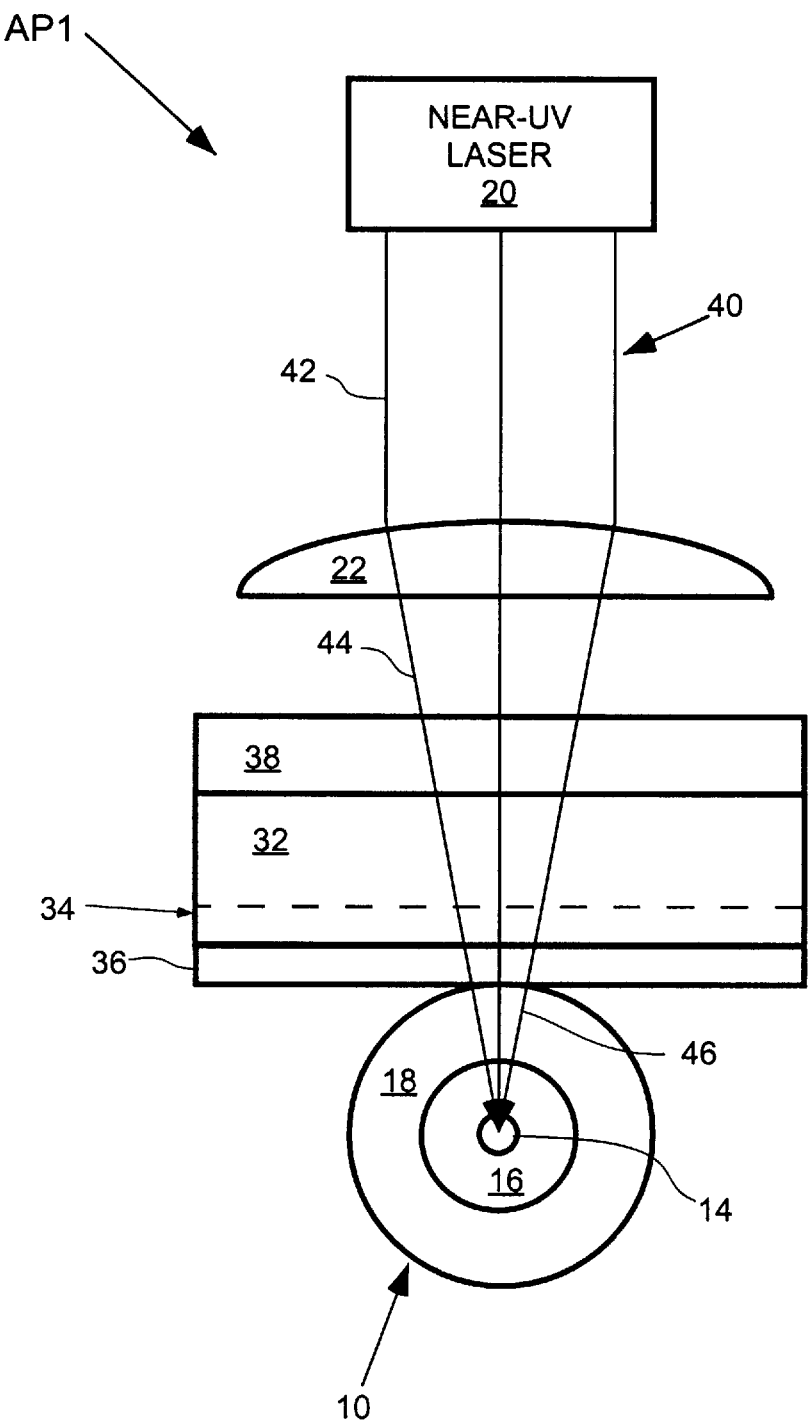
FIG. 2 is a schematic end view of the system of FIG. 1.

In accordance with the present invention, a system AP1 for inducing in an optical fiber 10 an index-of-refraction grating 12 comprises a continuous near-UV light source 20, a focusing lens 22, and a phase mask 30, as shown in FIGS. 1 and 2. Optical fiber 10 comprises a core 14, a cladding 16, and a coating 18. Core 14 has less than 4 micron ($\mu$m) diameter and is formed of (30 mol %) germanium-doped silica. (Typical ranges include 2–10 $\mu$m core diameter and 3–30 mol %.) Cladding 16 has a diameter of 125 $\mu$m and is formed of silica with an index of refraction slightly smaller than that of core 14 to promote internal reflections of light transmitting through the core. Coating 18 is about 400 $\mu$m in diameter and is of a near-UV transmitting silicone. Core 14 can contain boron and/or be hydrogen loaded to enhance photosensitivity of fiber 10 to facilitate grating induction.

UV source 20 is an argon laser tuned and filtered to yield light 40 of a single wavelength near 334 nm. Light 40 leaves source 20 as a collimated beam 42. Lens 22 redirects collimated beam 42 to define converging beam 44 that focuses within or near core 14 so that that is the locus of a maximum interference effect.

Phase mask 30 is a silica-polymer-silica sandwich comprising a polymethylmethacrylate (PMMA) phase-mask body 32 with a surface relief pattern 34, a glass shield 36 covering surface relief pattern 34, and a glass back support 38. PMMA is a polymer that is highly transmissive of light at 334 nm. Surface relief pattern 32 acts as a bank of beam splitters extending longitudinally parallel to fiber 10. Light 44 originally directed transversely with respect to fiber 10 is split into rearwardly 46 and forwardly 46 directed beams that interfere with each other at core 14. This interference at photosensitive core 14 results in the formation of refraction-index grating 12. Glass shield 36 is 200 $\mu$m thick. A shield of less than 300 $\mu$m is preferred to limit losses in interference strength. Back support 38 is 1 mm thick to provide rigidity to phase-mask body 32.

Figure 3:
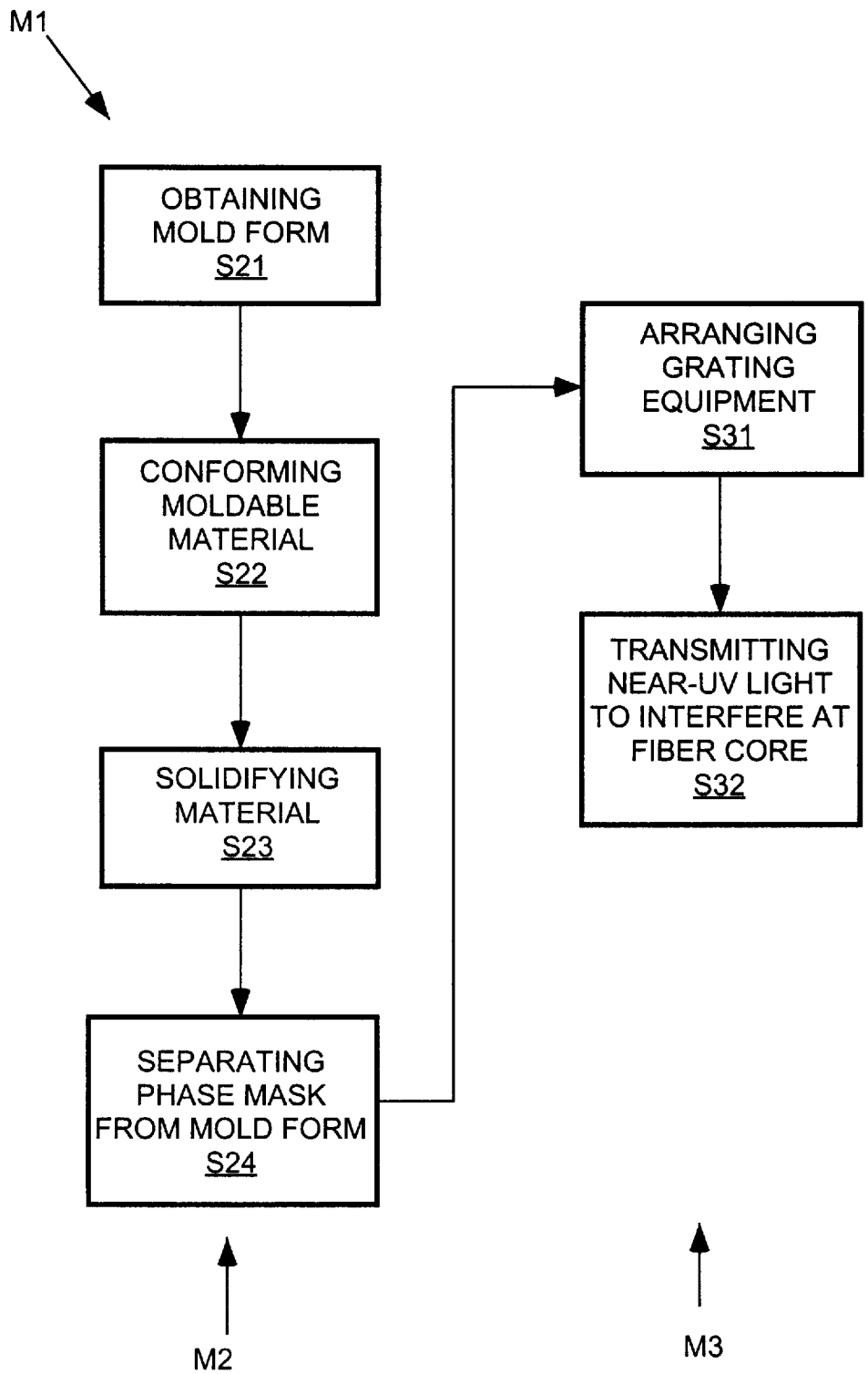
FIG. 3 is a flow chart of a method of making and using a phase mask in conjunction with the system of FIG. 1 in accordance with the present invention.

A method M1 for inducing grating 12 in fiber 10 in accordance with the present invention is flow charted in FIG. 3. Method MI includes two sub-methods: method M2 provides for fabrication of the phase mask, while method M3 provides for use of phase mask in generating grating 12.

Figure 4A:
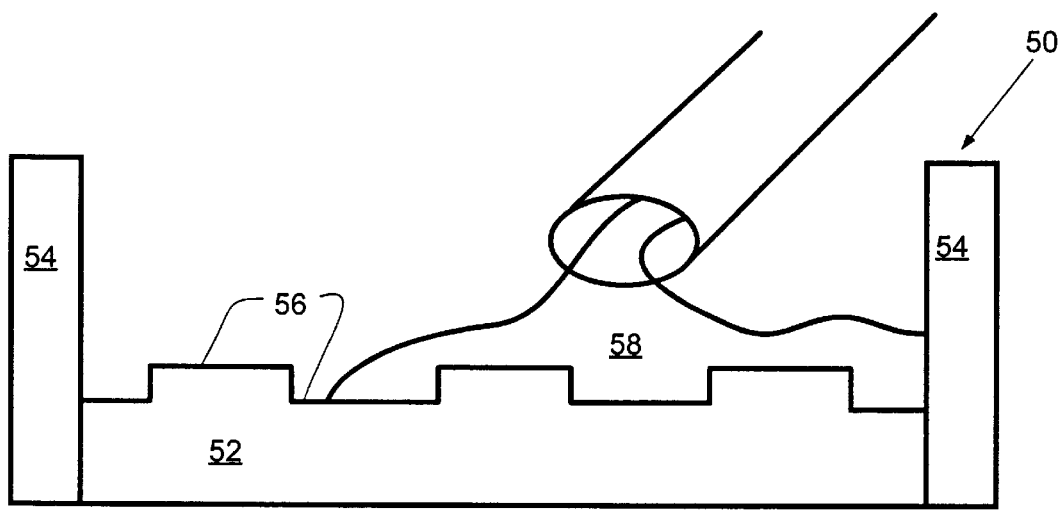
FIG. 4A–4C give a schematic representation of some of the steps of the method of FIG. 3.

Method M2 begins at step S21 with obtaining, for example, by assembling, a mold form 40, as shown in FIG. 4A. Mold form 50 includes a substrate 52 and four (two shown) sidewalls 54. Substrate 52 has a surface relief pattern 56 inverse to that of to-be-formed phase mask 30. Generally, the substrate can be any of a variety of materials into which such a pattern can be formed, e.g., metal, glass, or a silica phase mask itself.

Inverse surface relief pattern 54 can be formed by a variety of methods, including the electron gun stepping used to form 245 nm phase masks disclosed in U.S. Pat. No. 5,347,588. Conveniently, a phase mask made for the purpose of writing with 245 nm light is used for substrate 52. In this case, the depth of the relief pattern is optimized for 245 nm writing through a material with the index of refraction of silica, e.g., about 1.5. If the same mask were used for writing at 334 nm, the interference pattern would not be as strong. However, this loss of interference-pattern visibility can be compensated, at least in part, by using a phase-mask body material with a refractive index higher than that of the 245 nm mask used as a mold substrate. More generally, if the grating strength need not be maximal, the use of existing 245 nm (or other mid-UV) phase masks for molding near-UV phase masks can be convenient and economical.

Figure 4B:
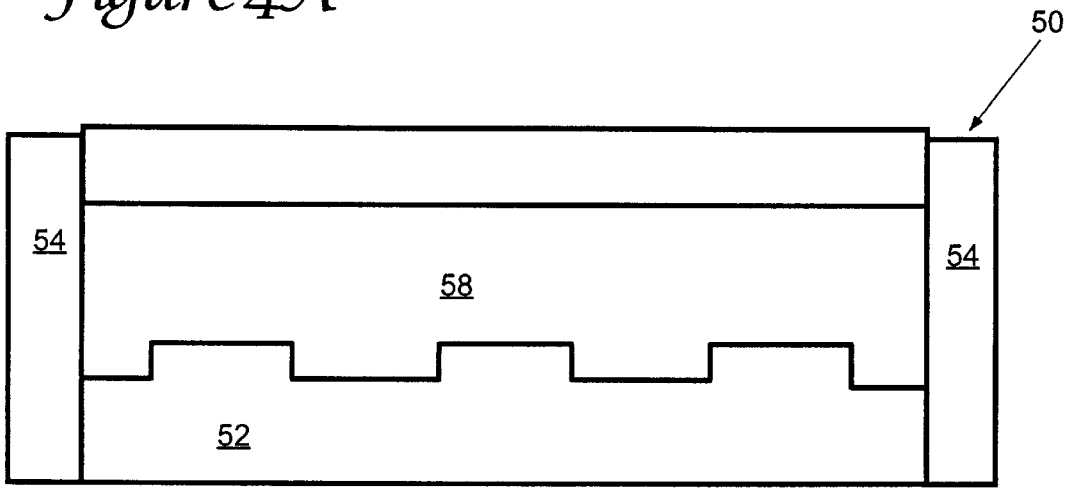

Step S22 involves conforming moldable material 58 to sidewalls 54 and surface relief pattern 56. In the preferred embodiment, PMMA pre-polymer is poured into mold form 50, as shown in FIG. 4A, so that it conforms to surface relief pattern 56 and is confined laterally by sidewalls 54, as shown in FIG. 4B. Support 38 is used as a mold cover to ensure a flat back surface of phase-mask body 32. Alternatively, a separate mold cover plate can be used and replaced by a support, if desired, after solidification. In this latter case, the mold cover plate need not be transparent to near-UV light.

Step S23 involves solidifying the moldable material. In the present case, solidification occurs through polymerization. Alternatively, the moldable material can be a fluid or plastic at an elevated temperature that solidifies upon cooling to room temperature. Herein, words with "solid" at the root refer to materials that can maintain a surface relief pattern—including glass in its supercooled state. Thus, the moldable material can be sol-gel glass, in which case the phase mask is supercooled glass.

Figure 4C:
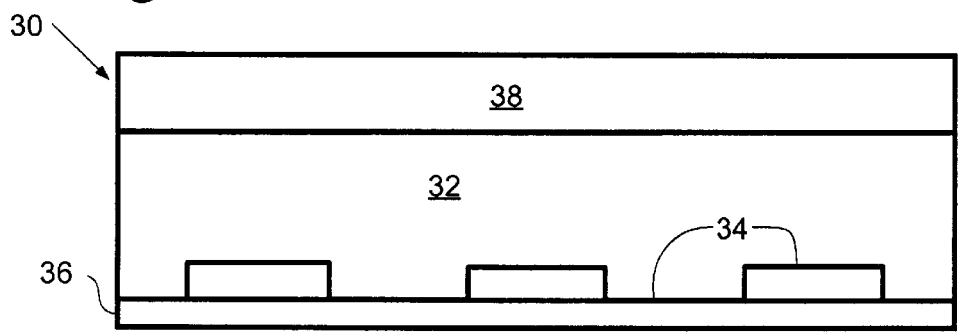

Step S24 involves separating the phase mask from the mold form. This can be accomplished by removing four sidewalls 54 and prying loose phase mask 30 from substrate 52. Shield 36 can be applied over surface relief pattern 34 as indicated in FIG. 4C. Shield 36 prevents the interstices of surface relief pattern 34 from being filled with particles that can be dislodged from a fiber coating due to heat as a grating is being written. Alternatively, the interstices can be pre-filled with another material having a refractive index different from that of PMMA. Another alternative is to allow the shield to enclose the surface relief pattern and fill the interstices with a fluid (gas or liquid) with a suitably different refractive index.

Method M3 begins with a step 31 of arranging the grating inducing equipment as shown in FIGS. 1 and 2. Phase mask 30 can be placed on coating 18 of fiber 10 over the core region in which grating 12 is to be formed. If a stronger grating is desired, coating 18 can be removed locally and phase mask 20 disposed against or near cladding 16. The positioning and orientation of phase mask 30 are such that when laser light is transmitted therethrough, an interference pattern is formed which extends through core 14. Note that the period of the grating can be adjusted by tilting phase mask 20 relative to the longitudinal extent of fiber 10.

In addition, step 31 involves arranging laser 20 and focusing lens 22, as indicated in FIG. 1, so that light is directed through phase mask 30 and into core 14. Optionally, fiber 10 and phase mask 30 can be mounted on a stage to provide for movement together relative to the writing light. Such movement allows writing gratings that are longer than the longitudinal extent of the interference pattern.

Step 32 involves transmitting laser light through phase mask 30 to generate an interference pattern in core 14. If a long grating is desired, the stage can be moved during exposure. Each area in which the grating is to be formed is continuously exposed for about one minute at a spatially averaged intensity of about 5 kilowatts per square centimeter.

Figure 5:
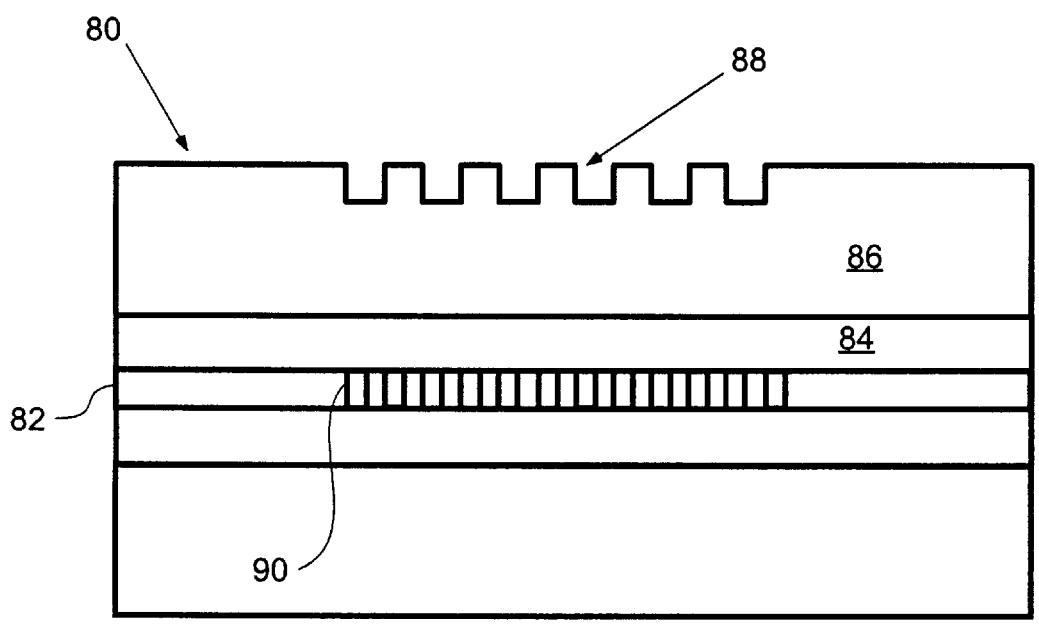
FIG. 5 is an alternative embodiment of the invention with a phase mask formed in the coating of an optical fiber.

In accordance with a variation of the present invention, an optical fiber 80 includes a core 82, a cladding 84, and a coating 86, as shown in FIG. 5. Formed in coating 86 is a square wave surface relief pattern 88. Coating 86 thus can serve as a phase mask for generating an interference grating 90 in core 82. Surface relief pattern 88 can be formed for example by heating coating 86 until it is tacky and pressing a surface relief pattern, e.g., surface relief pattern 56 of substrate 52, into coating 86. Coating 86 is then cooled and the mold surface relief pattern removed.

In the case of fiber 80, no separate phase mask is required to induce the grating. Another advantage of fiber 80 is that the phase mask is permanently aligned with the grating. If the grating weakens (due to exposure to heat), it can be reestablished by shining near-UV light through pattern 88 into core 82.

Figure 6A:
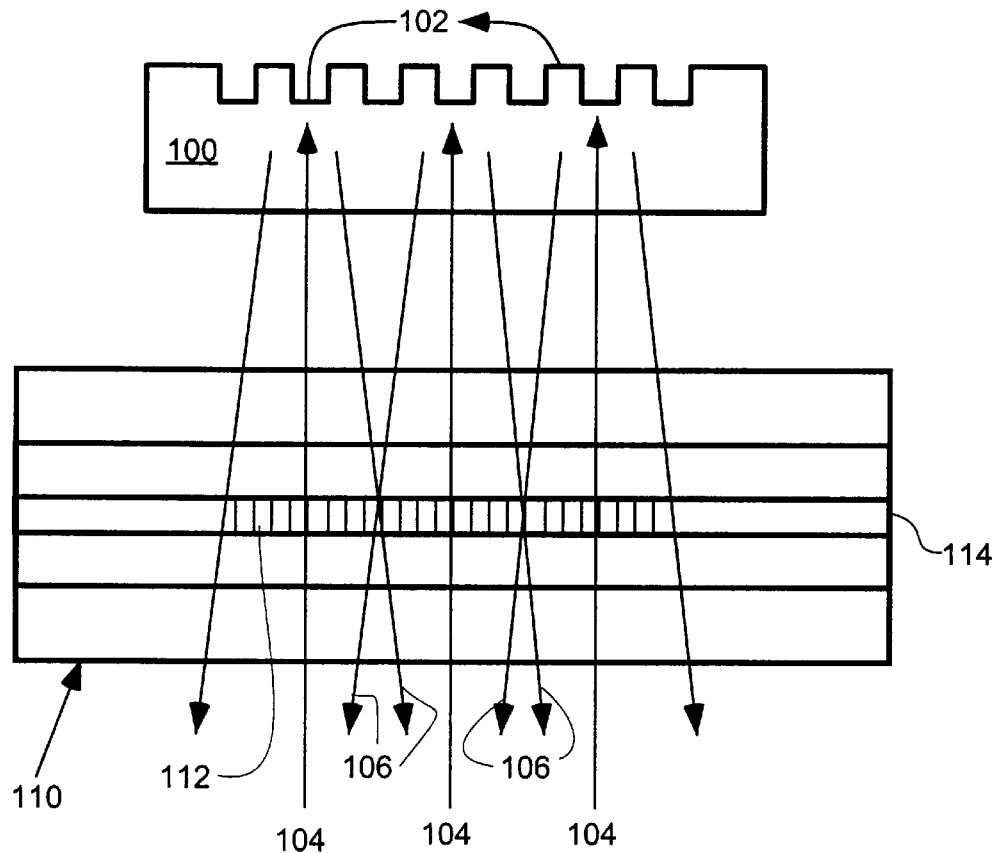
FIGS. 6A and 6B are respectively schematic side and end views of a fiber and a reflective phase mask for inducing a grating in said fiber in accordance with the present invention.
Figure 6B:
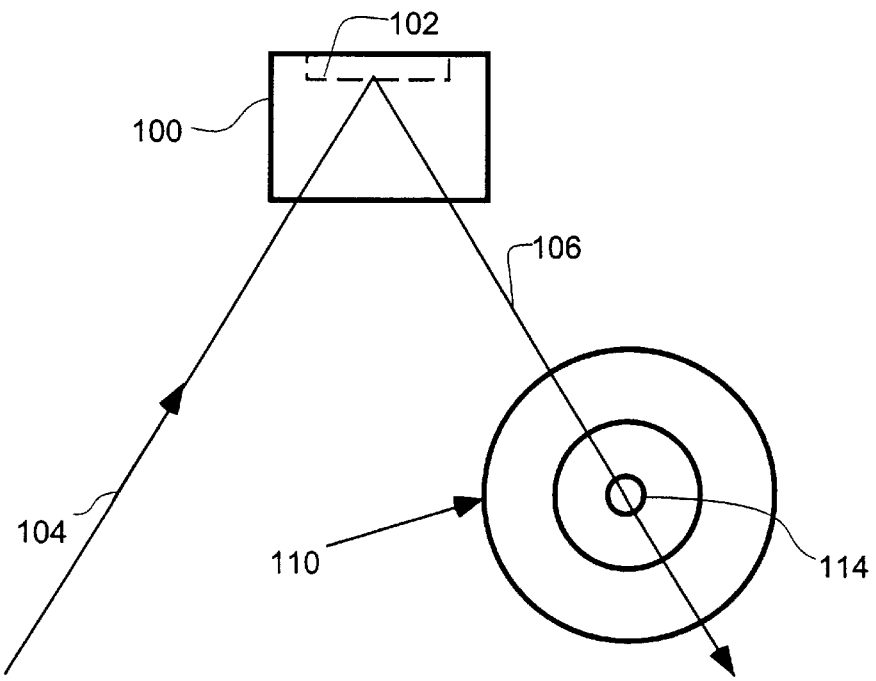

In accordance with a further embodiment of the invention, shown in FIGS. 6A and 6B, a phase mask 100 has a back-face surface relief pattern 102 on its back face. Surface relief pattern 102 is coated with aluminum metal to enhance its reflectivity to near UV light. Incident near-UV.light 104 is directed into the front face of mask 100, is reflected off reflective surface relief pattern 102 to form reflected beams 106. Reflected beams 106 exit the front face of phase mask 100 and interfere at fiber 110 to create a spatially-varying light pattern. Alternately, the mask can have a surface relief pattern on its front face (not shown) and coated with metal to be reflective, and incident near-UV light 104 is directed into the front face of such mask and is reflected off its reflective surface relief pattern to form reflected beams 106. The light pattern from these reflected beams 106 creates a refractive-index grating in the core 114 of fiber 110. One advantage of using a phase mask with a reflective surface relief pattern on its back face is that, since the surface relief pattern is on the back (away from the fiber) face of the mask 100, the depth of the surface relief pattern can be made shallower by a factor of $2n/(n-1) \approx 6$ (compared to the depth of the surface relief pattern when using the transmissive geometry of FIG. 1).

Figure 7:
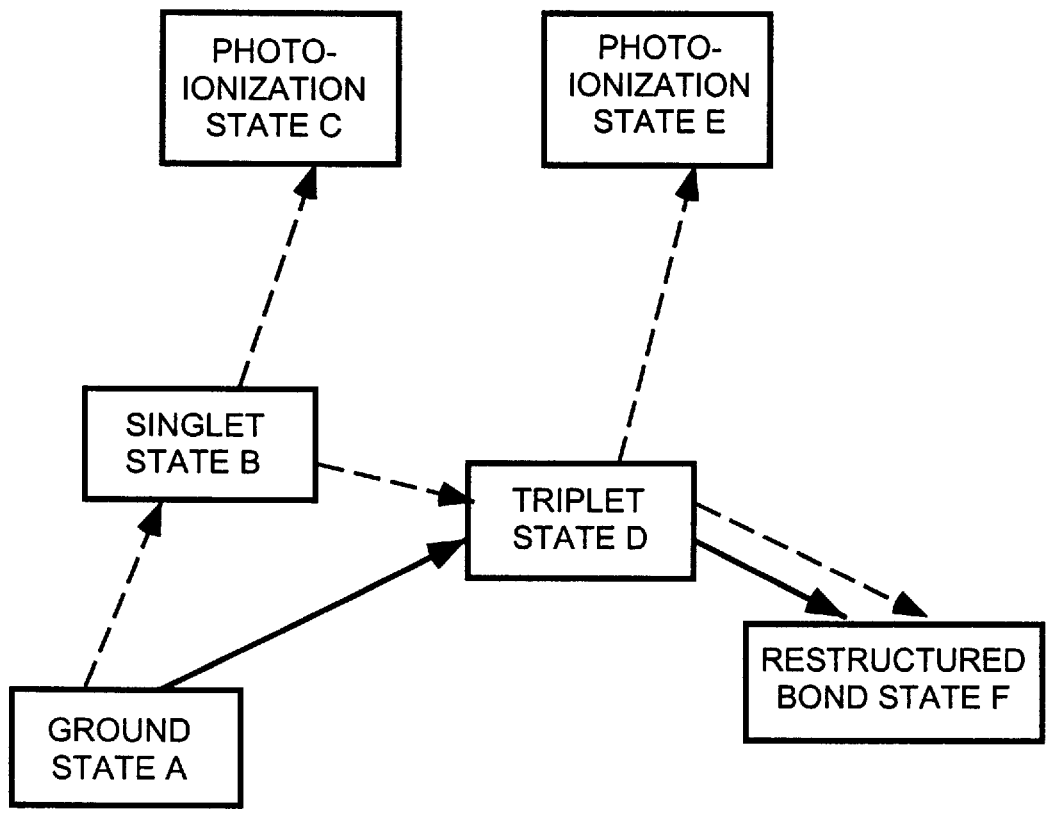
FIG. 7 is a schematic representation of state changes induced in a fiber using near-UV light (solid lines) and mid-UV light (dashed lines).

As indicated above, the present invention is surprisingly effective at generating gratings given the much lower absorption at the longer ultraviolet wavelengths. By way of explanation and not of limitation, the following theoretical discussion may aid understanding. FIG. 7 presents various states of a GODC in an optical fiber. The ground state is shown at A. A photon of 245 nm light can excite the site to a singlet state B. Either spontaneously or due to the energy of a second 245 nm photon, an electron can be released, corresponding to state C. It has been believed that it was necessary to dislodge an electron from a GODC in a germanium doped optical fiber to produce a change of refractive index. As explained below, this belief may have been erroneous.

Also spontaneously, a singlet state B can drop to a triplet state D. Another 245 nm photon can cause an electron release to state E. Otherwise, it is believed that the triplet state can drop to a state F though a bond breaking. The bond breaking results in a change of bond structure. It is proposed that it is this bond restructuring rather than the loss of electrons that contributes to the change in the index of refraction. Instead, the electron loss is associated primarily with an undesirable increase in a fibers absorption of throughgoing light.

When 334 nm light is used for writing, a single photon is generally not energetic enough to reach the singlet state B. Instead, triplet state D is entered directly. Again, continuous wave 334 nm light is generally not efficient in exciting from triplet state D to electron loss state E. Instead, triplet state D spontaneously converts to bond-modified state F. Thus, the conversion to bond breaking and molecular reorientation is relatively direct and occurs relatively frequently. The decrease in absorption due to the exclusion of the ground to singlet path is compensated by the increased efficiency of the index-changing process. This explains the surprising effectiveness of 334 nm light in generating changes in index of refraction.

Concomitantly, the 334 nm light causes a lower loss of electrons. Thus, there is less of an increase in absorption in the fiber so that fiber transmission characteristics in the infrared wavelength transmission windows at 1.3 microns and 1.5 microns are better preserved when 334 nm light is used. 245 nm light, on the other hand, undesirably increases absorption in the infrared, especially in a hydrogen-loaded fiber. The increase in infrared absorption can be ameliorated, for example, by annealing the fiber for approximately two days at approximately 150° C.; the present invention obviates the need for this time-consuming annealing.

Fibers made in accordance with method M1 are distinguishable from fibers made using shorter wavelength ultra-violet light. In general, there is less damage and a smaller increase in absorption. In the former case, the absorption of light at 290 nm is at least ten times less than its absorption of light at 240 nm; in the latter case, the absorptions are usually within a factor of four of each other. In the former case, the fiber has a paramagnetic resonance spectrum in which the Ge(1) center is not seen; the strength of the Ge(1) center is at least an order of magnitude less that the strength of the GeE' center; in the latter case, the strengths are within a factor of three of each other.

The present invention applies not only to single-core fibers, but also to multi-core fibers, such as those used for fiber lasers. In addition, the gratings can be induced in both single-mode and multi-mode fibers. Furthermore, the invention applies to optical media other than fibers—for example, planar optical waveguides on a substrate.

The present invention allows a selection of light sources to provide the 275 nm to 390 nm near-UV light. Argon lasers, nitrogen lasers (337 nm), helium-cadmium lasers (325 nm and 354 nm), excimer lasers, e.g., xenon-chloride (308 nm), are all known to produce light in the required wavelength range. Argon lasers can provide light over a range extending from 275 nm to 386 nm. Krypton lasers span the range 337 nm to 356 nm. Furthermore, various infra-red lasers can provide harmonics in the desired near ultra-violet range. Advances in laser technology, including dye-lasers and diode-pumped solid-state lasers, promise to provide more choices in writing light sources.

The periodicity of the phase mask can be in the form of a surface relief pattern. In this case, the surface relief pattern defines a spatially varying index of refraction at the mask-air interface. Alternatively, the phase mask can include an internal spatially varying index of refraction and not require a surface relief pattern. In either case, the grating period can be constant or varying, e.g., chirped, to generate a corresponding periodicity in the fiber grating. The phase mask can include an amplitude gradient or an amplitude filter which can be used with the phase mask to create intensity variations along the grating. The phase-mask material can be a polymer, a plastic, a silica glass, a silicate glass (e.g., one containing fluorine or phosphorous), or other near-UV transmissive material.

As with gratings written with 245 nm light, the grating period is one-half that of a phase mask when 334 nm light is used and the mask is parallel to the core, i.e., the grooves of the mask are perpendicular to the fiber axis. The grating period can be modified by tilting the phase mask relative to fiber core. However, if the angle is too large, the resulting "blazed" grating will deflect light out of the core rather reflect it down a return path. Also, the angle of the grating in the core can be adjusted by arranging the surface relief pattern of the phase mask at an angle to the core. In the case of the surface relief pattern, it can be a square wave, a sine wave, or any number of shapes. The phase mask can include curved surfaces to serve as a focusing lens.

Much of the preceding discussion has focused on the flexibility the present invention affords in selecting a material for the phase mask. A similar flexibility is afforded to the selection of the material for focusing lens 22 since this lens does not need to be transparent to 245 nm light. In particular, a lens or combination of lenses can be molded plastic instead of ground fused silica. Molding allows a larger range of lens geometries, in particular aspherical geometries. This in turn, allows greater optimization of the optical path used for writing a grating.

In the preferred embodiment, the coating is left intact during writing. However, a stronger grating may be obtainable by removing the coating, so this option is within the scope of the invention. In most cases, however, the convenience of leaving the coating in place will outweigh gains in grating strength. While the disclosed fiber is hydrogen loaded and/or highly doped with germanium, other light-sensitive fiber materials can be used. These and other variations upon and modification to the disclosed embodiments are provided for by the present invention, the scope of which is limited only by the following claims.

What is claimed is:

1. An optical fiber comprising:
   a cladding;
   a core having a core segment with a refractive-index grating having an average periodicity between 0.2 $\mu$m and 2.0 $\mu$m, said core segment having an absorption of light at 290 nm is at least 10x less than its absorption of light at 240 nm.

2. An optical fiber as recited in claim 1 wherein said core segment has a paramagnetic resonance spectrum in which the strength of the Ge(1) center is at least an order of magnitude less than the strength of the GeE' center.

3. An optical fiber comprising:

a cladding;

a core having a core segment with a refractive-index grating having an average periodicity between 0.2 μm and 2.0 μm, said core segment has a paramagnetic resonance spectrum in which the strength of the Ge(1) center is at least an order of magnitude less than the strength of the GeE' center.

* * * * *